US007965736B2

(12) United States Patent
Ling

(10) Patent No.: US 7,965,736 B2
(45) Date of Patent: Jun. 21, 2011

(54) TRANSMISSION OF MULTIPLEX PROTOCOL DATA UNITS IN PHYSICAL LAYER PACKETS

(75) Inventor: Fan Ling, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1015 days.

(21) Appl. No.: 11/211,232

(22) Filed: Aug. 24, 2005

(65) Prior Publication Data

US 2007/0047574 A1 Mar. 1, 2007

(51) Int. Cl.
H04J 3/22 (2006.01)
H04J 3/04 (2006.01)

(52) U.S. Cl. ........ 370/465; 370/535

(58) Field of Classification Search ........ 370/465, 370/535–542, 466, 395.64, 319, 349, 474, 370/335–337
See application file for complete search history.

(56) References Cited

U.S. PATENT DOCUMENTS

| 5,936,965 | A  | * | 8/1999  | Doshi et al. ........ 370/469 |
| 6,590,882 | B1 | * | 7/2003  | Fong et al. ........ 370/335 |
| 6,754,276 | B1 | * | 6/2004  | Harumoto et al. ........ 375/240.26 |
| 6,819,660 | B2 | * | 11/2004 | Khare et al. ........ 370/342 |
| 6,850,508 | B1 | * | 2/2005  | Chang et al. ........ 370/335 |
| 6,904,037 | B2 | * | 6/2005  | Oran et al. ........ 370/352 |
| 6,959,020 | B1 | * | 10/2005 | Hourunranta et al. ........ 370/542 |
| 7,020,123 | B2 | * | 3/2006  | Park et al. ........ 370/342 |
| 7,327,791 | B1 | * | 2/2008  | Sekiguchi et al. ........ 375/240.27 |
| 2002/0036993 | A1 |  | 3/2002 | Park |
| 2002/0064145 | A1 |  | 5/2002 | Khare |
| 2003/0072309 | A1 | * | 4/2003 | Watanabe et al. ........ 370/392 |
| 2004/0017823 | A1 |  | 1/2004 | Kim et al. |

(Continued)

FOREIGN PATENT DOCUMENTS

GB 2365713 A 2/2002

(Continued)

OTHER PUBLICATIONS

Miki T, et al, Error resilience features of MPEG-4 audio-visual coding and their application to 3g multimedia terminals, Communication Technology Proceedings, 2000. WCC-ICCT 2000. International Conference on Beijing, China Aug. 21-25, vol. 1, Aug. 21, 2000, pp. 805-808.

(Continued)

*Primary Examiner* — Kwang B Yao
*Assistant Examiner* — Candal Elpenord
(74) *Attorney, Agent, or Firm* — Kyong H. Macek; Ashish L. Patel

(57) ABSTRACT

A transmitter generates MUX-PDUs for video, audio, data, and/or control streams based on a fixed PHY packet size such that all or a substantial percentage of the MUX-PDUs conform to the PHY packet size. The MUX-PDUs have variable sizes and are mapped to PHY packets such that (1) each MUX-PDU that is smaller than the PHY packet size is sent in one PHY packet and (2) each MUX-PDU that is larger than the PHY packet size is sent in a minimum number of PHY packets. Each MUX-PDU is padded with one or more null MUX-PDUs and/or one or more padding bytes, if needed, to obtain the PHY packet size. Each PHY packet is sent in one transmission time interval (TTI) to a receiver. The receiver performs the complementary processing on the received PHY packets to recover the MUX-PDUs. The receiver forwards each valid MUX-PDU and discards any padding.

4 Claims, 5 Drawing Sheets

U.S. PATENT DOCUMENTS

| | | | |
|---|---|---|---|
| 2004/0179556 A1* | 9/2004 | Kobayashi et al. | 370/535 |
| 2004/0258091 A1* | 12/2004 | Meyer et al. | 370/469 |
| 2005/0053064 A1* | 3/2005 | Wang | 370/389 |
| 2005/0135291 A1 | 6/2005 | Ketchum | |
| 2005/0174985 A1* | 8/2005 | Lee et al. | 370/349 |
| 2006/0013268 A1* | 1/2006 | Terry | 370/537 |
| 2006/0026882 A1 | 2/2006 | Miller et al. | |
| 2006/0062312 A1* | 3/2006 | Lee et al. | 375/240.27 |
| 2006/0268821 A1* | 11/2006 | Terry | 370/349 |

FOREIGN PATENT DOCUMENTS

| | | |
|---|---|---|
| KR | 1020020040897 | 5/2002 |
| WO | 9900988 | 1/1999 |
| WO | WO0074344 | 12/2000 |
| WO | WO0133772 | 5/2001 |

OTHER PUBLICATIONS

International Search Report and Written Opinion—PCT/US2006/033054, International Search Authority—European Patent Office—Feb. 22, 2007.

Tanaka Hirokazu, et al, Performance of an error resilient multimedia multiplexing scheme on a Rayleigh fading channel, Vehicular Technology Conference, 1999. VTC 1999-Fall. IEEE VTS 50th Amsterdam, Netherlands Sep. 19-22, 1999, Piscataway, NJ, USA, IEEE, US, vol. 1, Sep. 19, 199, pp. 376-380.

* cited by examiner

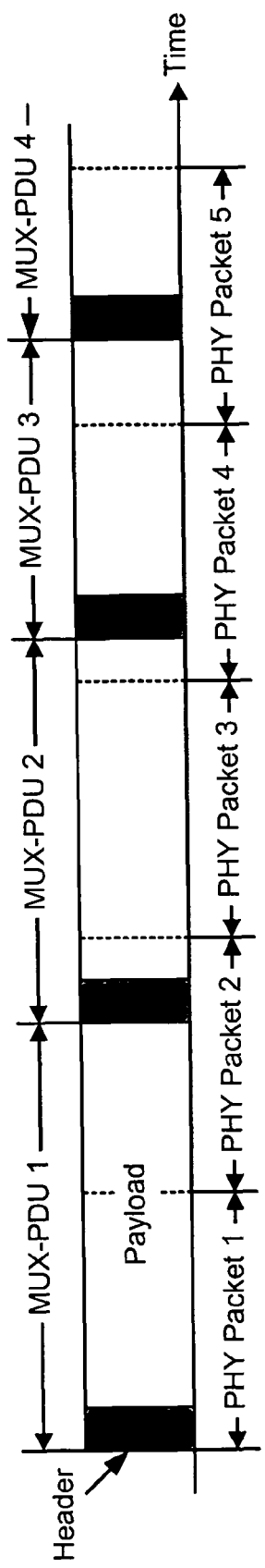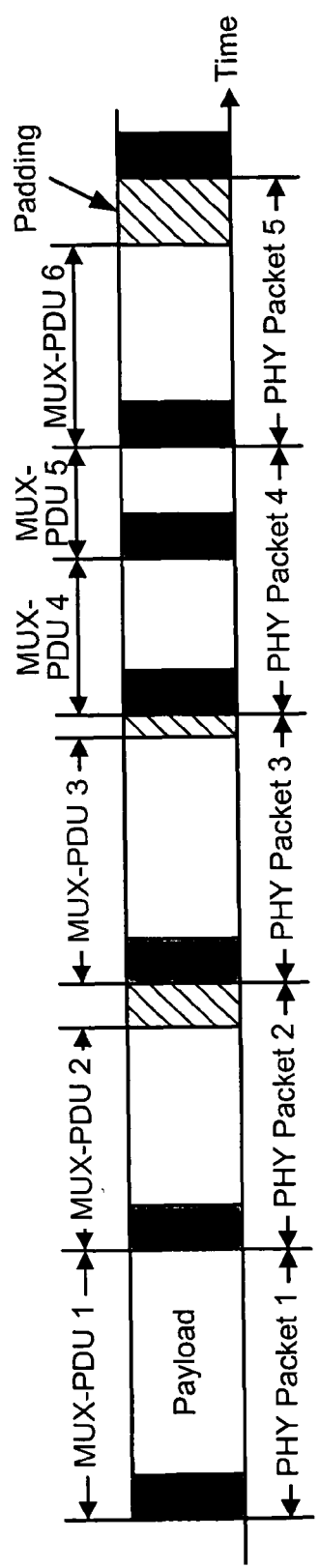
FIG. 3
FIG. 4

TRANSMISSION OF MULTIPLEX PROTOCOL DATA UNITS IN PHYSICAL LAYER PACKETS

BACKGROUND

I. Field

The present invention relates generally to communication, and more specifically to techniques for transmitting and receiving multiplex protocol data units (MUX-PDUs) in a wireless communication system.

II. Background

Wireless communication systems are widely deployed to provide various communication services such as voice, video, packet data, and so on. These systems may be multiple-access systems capable of providing communication for multiple users by sharing the available system resources (e.g., the system bandwidth and/or transmit power). Examples of such multiple-access systems include a Code Division Multiple Access (CDMA) system, a Time Division Multiple Access (TDMA) system, a Frequency Division Multiple Access (FDMA) system, and an Orthogonal Frequency Division Multiple Access (OFDMA) system.

Videophone or video telephony is a rapidly growing application for many wireless communication systems. A videophone application transmits voice and video simultaneously using, for example, ITU-T Recommendation H.223 (or simply, "H.223"), entitled "Multiplexing Protocol for Low Bit Rate Multimedia Communication." H.223 is a protocol that receives video, audio, data, and control as separate media streams and generates MUX-PDUs for all of these streams. The MUX-PDUs are then mapped to, or encapsulated within, PHY packets, which are packets at a physical layer (PHY). The PHY packets are further processed and transmitted via a wireless channel to a receiver.

The receiver typically receives some percentage of PHY packets in error due to noise and impairments in the wireless channel. The PHY packets received in error are often called erased PHY packets. Typically, all MUX-PDUs carried in the erased PHY packets are also lost. Since erased PHY packets are inevitable for a wireless system, there is a need in the art for techniques to reduce the number of lost MUX-PDUs due to the erased PHY packets.

SUMMARY

Techniques for efficiently sending MUX-PDUs in PHY packets in a wireless communication system are described herein. The PHY packets may have a fixed size that may be configured or selected during call setup. The MUX-PDUs are generated based on the PHY packet size such that all or a substantial percentage of the MUX-PDUs conform to the PHY packet size. For example, a video encoder may encode a video signal to generate coded video slices, and each video slice may be sent in one MUX-PDU. An audio encoder may encode an audio signal to generate coded audio packets, and one or more audio packets may be sent in one MUX-PDU. Each MUX-PDU that conforms to the PHY packet size is sent in one PHY packet.

At a transmitter, MUX-PDUs are generated for multiple media streams (e.g., video, audio, data, and/or control streams) based on the PHY packet size. The MUX-PDUs have variable sizes and are mapped to PHY packets such that (1) each MUX-PDU that is smaller than the PHY packet size is sent in one PHY packet and (2) each MUX-PDU that is larger than the PHY packet size is sent in a minimum number of PHY packets. Each MUX-PDU is padded with one or more null MUX-PDUs and/or one or more padding bytes, if needed, to obtain the PHY packet size. The padding is selected such that it is not mistaken for a MUX-PDU header or valid data. Each PHY packet may be sent in one transmission time interval (TTI) to a receiver.

The receiver performs the complementary processing on the received PHY packets to recover the MUX-PDUs. The receiver forwards each valid MUX-PDU and discards any padding encountered. The receiver further demultiplexes the video, audio, data, and control in the recovered MUX-PDUs onto their respective media streams.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

FIG. 3 shows the mapping of MUX-PDUs to PHY packets without alignment.

FIG. 4 shows the mapping of MUX-PDUs to PHY packets with alignment.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
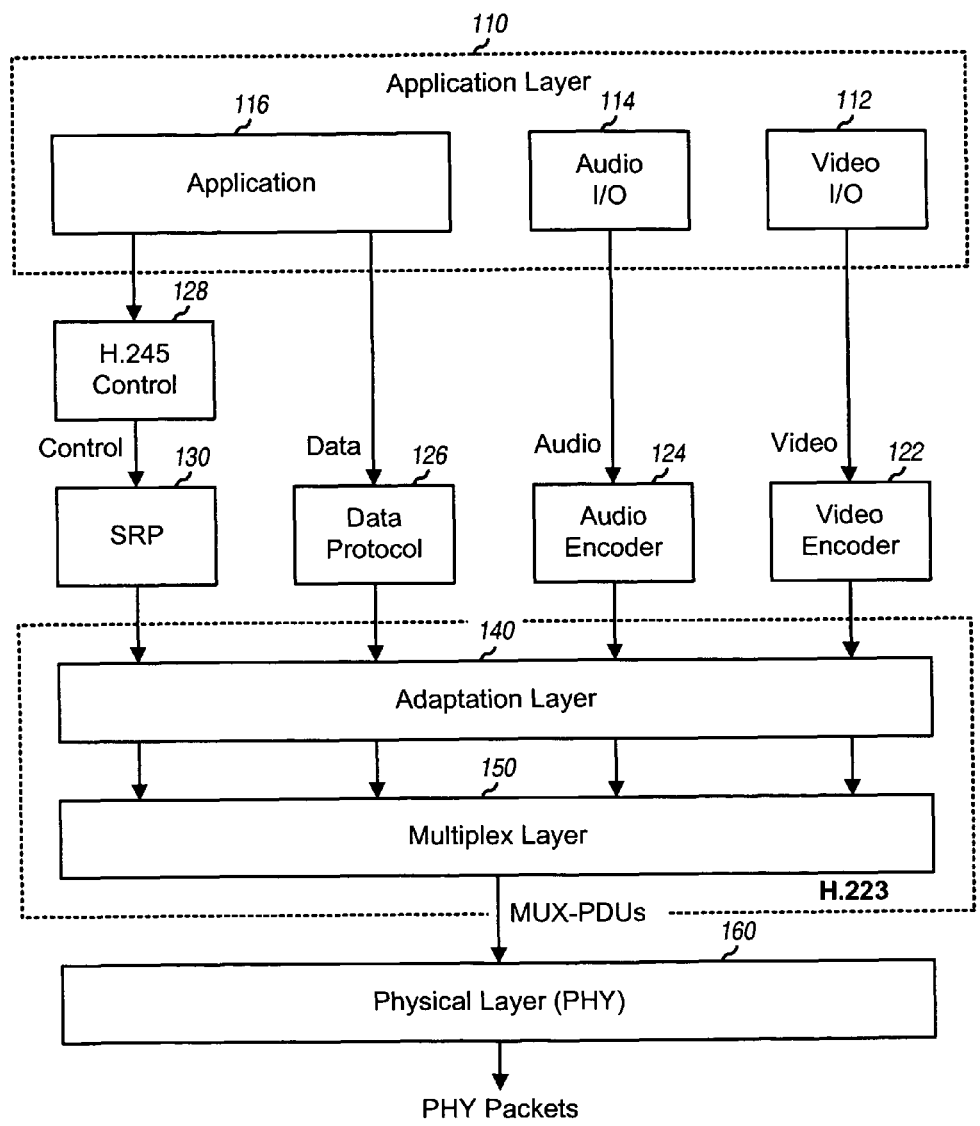
FIG. 1 shows the processing and multiplexing at a transmitter for a videophone call.

FIG. 1 shows a block diagram of the processing and multiplexing at a transmitter for a videophone call using ITU-T Recommendation H.324M (or simply, "H.324M"). H.324M is a modified version of ITU-T Recommendation H.324, entitled "Terminal for Low Bit Rate Multimedia Communication." H.324 is an international standard for multimedia communication on a low bit rate circuit-switched system and utilizes H.223 as a data transfer/multiplexing protocol.

At an application layer 110, the videophone call is processed as separate video, audio, data, and control signals that are sent on different logical channels. The data may be for text or some other content. Each logical channel is identified by a unique logical channel number (LCN). LCN 0 is used for the control channel. The number of logical channels to use for the videophone call and the content to be carried by each logical channel are defined during call setup.

A video encoder 122 processes a video signal from video input/output (I/O) 112 and provides a coded video stream. An audio encoder 124 processes an audio signal from audio I/O 114 and provides a coded audio stream. A data signal from an application 116 is processed by a data protocol (block 126) to generate a data stream. A control signal from application 116 is processed in accordance with an ITU-T Recommendation H.245 (or simply, "H.245"), entitled "Control Protocol for Multimedia Communication" (block 128), and further processed in accordance with a Simple Retransmission Protocol (SRP) (block 130) to generate a control stream.

H.223 includes an adaptation layer 140 and a multiplex layer 150. Adaptation layer 140 receives and processes the video, audio, data, and control streams separately. Adaptation layer 140 adds information to each media stream, if applicable, for error detection and/or error correction, sequence numbering, and retransmission. Adaptation layer 140 generates adaptation layer service data units (AL-SDUs) for each media stream. Each AL-SDU for the video stream may carry coded video for one frame, one slice, or some other unit of video. A video slice corresponds to some number of rows and some number of columns of a video frame. Each AL-SDU for the audio stream typically carries up to three audio packets since more bundled audio packets will increase delays.

Multiplex layer 150 receives the AL-SDUs for all media streams and generates MUX-PDUs having variable lengths. Each MUX-PDU may carry data from one or more AL-SDUs for one or more media streams. For example, a single MUX-PDU may carry a combination of video, audio, and control. Multiplex layer 150 performs multiplexing in accordance with a multiplex table that contains up to 16 entries for up to 16 different MUX-PDU formats. Each MUx-PDU format indicates the number of bytes (if any) to be carried for each media stream in one MUX-PDU. Each MUX-PDU is in one of the formats indicated in the multiplex table. The multiplex table is defined during call setup and may be updated during the call.

A physical layer 160 receives the MUX-PDUs and generates PHY packets (or simply, "packets"). The processing by physical layer 160 is dependent on the system design and typically includes encoding, interleaving, symbol mapping, and so on. The PHY packets are transmitted via a wireless channel to a receiver.

For H.223, the transmitter multiplexes video, audio, data, and H.245 control into MUX-PDUs and sends these MUX-PDUs to the receiver. The receiver receives the MUX-PDUs and demultiplexes the video, audio, data, and control sent in these MUX-PDUs onto their separate media streams. The MUX-PDUs are the lowest level data units known to the videophone application. The videophone application typically has no knowledge of how the MUX-PDUs are transmitted by the physical layer.

Figure 2:
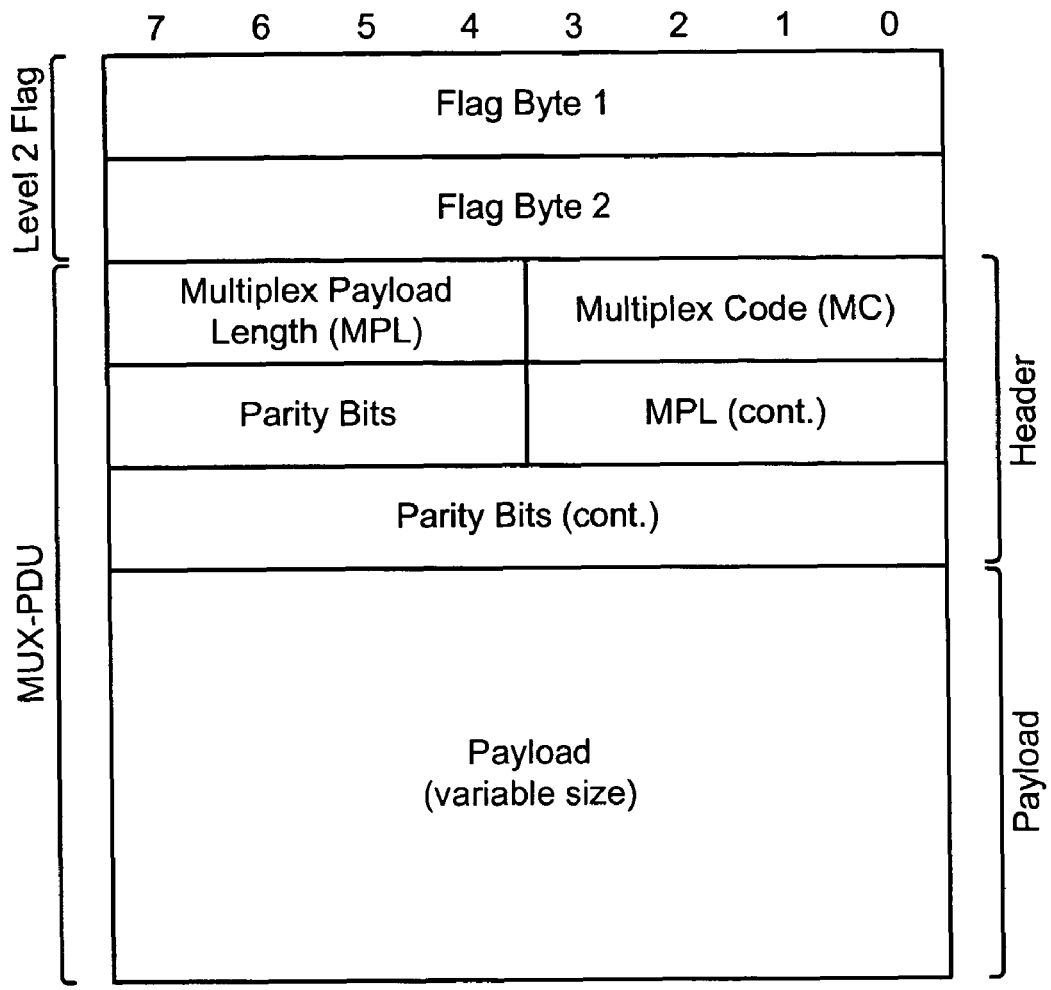
FIG. 2 shows the structure of a MUX-PDU.

FIG. 2 shows the structure of a MUX-PDU in accordance with level 2 protocol of H.223. The MUX-PDU is preceded by a 2-byte level 2 flag that may be set to one of two 2-byte values given by H.223. The level 2 flag delimits or borders each MUX-PDU and is used by the receiver to detect for a new MUX-PDU.

For level 2, the MUX-PDU includes a 3-byte header followed by a variable-size payload. The MUX-PDU header includes a 4-bit multiplex code (MC) field, an 8-bit multiplex payload length (MPL) field, and a 12-bit parity bits field. The MC field indicates the format of the MUX-PDU, which is one of the MUX-PDU formats defined in the multiplex table. The MPL field indicates the size of the MUX-PDU payload. The parity bits field carries 12 parity bits generated for the MC field and the MPL field. The MUX-PDU payload has a variable size that ranges from 0 to 254 bytes and is indicated by the MPL field.

H.223 covers multiplexing of media streams for a circuit-switched application. Such an application typically relies on the physical layer to provide a dedicated connection and a fixed data rate for a call. The media streams typically have data rates that may vary widely over time. The multiplexing techniques described herein efficiently multiplex MUX-PDUs onto PHY packets.

The multiplexing techniques described herein may be used for various wireless communication systems that support circuit-switched applications. One such system is a Wideband-CDMA (W-CDMA) system that is described in documents from a consortium named "3$^{rd}$ Generation Partnership Project" (3GPP). In W-CDMA, higher layer data may be sent in one or more transport channels such as, for example, a dedicated traffic channel (DTCH) and a dedicated control channel (DCCH). Each transport channel is associated with one or more transport formats, which may be selected during call setup. Each transport format specifies various processing parameters such as (1) the transmission time interval (TTI) for the transport channel, (2) the size of each transport block of data, (3) the number of transport blocks to be sent in each TTI, (4) the length of each code block, (5) the coding scheme to use for the TTI, and so on. Only one TTI is used for each transport channel, and the selected TTI may span one, two, four, or eight frames. Each frame is a 10 millisecond (ms) time interval that is identified by a system frame number (SFN).

A transport format that is commonly used for a videophone call has the following parameters: a data rate of 64 kilobits/second (kbps), a TTI of either 20 ms or 40 ms, and one transport block per TTI. The transport block for each TTI may be considered as a PHY packet. Each PHY packet carries 160 bytes for the 20 ms TTI and 320 bytes for the 40 ms TTI. A single transport format may be used for the videophone call, and the PHY packet size is then fixed for the duration of the call.

FIG. 3 shows the mapping of MUX-PDUs to PHY packets without alignment. For this non-aligned mapping scheme, each MUX-PDU is sent in as many PHY packets as needed and starting at the first available byte in the next PHY packet to be sent. If the MUX-PDU size ranges from 0 through 254 bytes and if the PHY packet size is fixed at 160 bytes, then each MUX-PDU may be sent in one or two PHY packets. Furthermore, a given PHY packet may carry multiple MUX-PDUs. For example, PHY packet 4 carries the tail portion of MUX-PDU 2 and the beginning portion of MUX-PDU 3.

The receiver receives the PHY packets and decodes each received PHY packet separately. Each PHY packet that is decoded correctly is passed up to the multiplex layer for processing and reassembly. Each PHY packet that is decoded in error (or erased) is discarded. Due to noise and impairments in the wireless channel, the error rate or the percentage of erased PHY packets may be relatively high. For each erased PHY packet, all of the MUX-PDUs carried by that erased PHY packet may be discarded. For example, if PHY packet 4 is decoded in error, then the entire MUX-PDU 3 is discarded since its header is lost in PHY packet 4, and the entire MUX-PDU 2 may also be discarded since its tail portion is missing. The amount of data that is lost at the multiplex layer is more than the amount of data that is lost by the physical layer because of non-alignment of the MUX-PDUs and the PHY packets for the two layers.

FIG. 4 shows the mapping of MUX-PDUs to PHY packets with alignment. For this aligned mapping scheme, the MUX-PDUs are generated and mapped such that, all or most of the time, each MUX-PDU is sent in one PHY packet. This mapping scheme allows each PHY packet that is decoded correctly to be fully used by the multiplex layer at the receiver. This scheme also minimizes the occurrence of the situation whereby more than one PHY packet worth of data is lost in the multiplex layer when only one PHY packet is decoded in error. Each MUX-PDU may be sent starting with the first byte in a PHY packet, and the PHY packet boundary is then aligned with the MUX-PDU boundary. In certain instances, it may not be possible to fit a large MUX-PDU into one PHY packet. In such instances, the large MUx-PDU may be sent in a minimum number of PHY packets.

The MUX-PDU formats and sizes are selected based on the PHY packet size. The video encoder may be designed based on the selected MUX-PDU size. For example, the video encoder may be capable of encoding a frame of video or a slice of video. Since a video decoder is able to independently decode each video slice, each MUX-PDU may carry one or more complete video slices. This may be achieved by (1) designing the video encoder to send one video slice at a time to the adaptation layer and (2) designing the adaptation and multiplex layers to attempt to fit one or more complete video slices into each MUX-PDU. The audio encoder may also be designed based on the selected MUX-PDU size to generate coded audio packets that can be sent in one PHY packet. The multiplex layer may thus be designed or customized based on the PHY packet size.

In most cases, the MUX-PDUs will be smaller than the PHY packet size. In these cases, a PHY packet may carry a single MUX-PDU, multiple MUX-PDUs, a single MUX-PDU with padding or stuffing, or multiple MUX-PDUs with padding. The multiplex layer may be designed to generate "aggregate" MUX-PDUs. Each aggregate MUX-PDU has the same size as the PHY packet size, carries one or more MUX-PDUs and padding (if needed), and is sent in one PHY packet.

Figure 5:
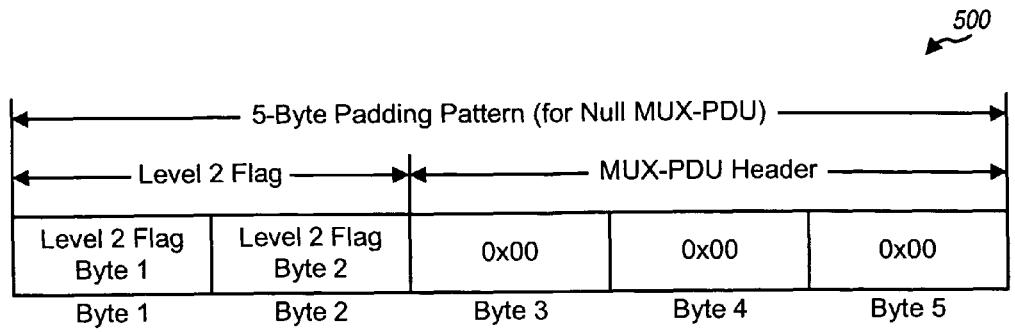
FIG. 5 shows a 5-byte padding pattern.

FIG. 5 shows a 5-byte padding pattern 500 that may be used for padding a MUx-PDU that is smaller than the PHY packet size. Padding pattern 500 includes five bytes. The first two bytes of padding pattern 500 are for the level 2 flag. The last three bytes of padding pattern 500 are for a MUX-PDU header that indicates a MUX-PDU payload size of zero (e.g., a MUx-PDU header of 0x00, 0x00, and 0x00, where '0x' denotes hexadecimal values to follow). Padding pattern 500 represents a "null" MUX-PDU having only a header and no payload (or a payload length of zero). Padding pattern 500 may be repeated as many times as needed until the PHY packet is completely or mostly filled. Other 5-byte padding patterns may also be used for padding (e.g., padding patterns formed with other possible 2-byte values for the level 2 flag).

Padding pattern 500 has a fixed length of five bytes. If the size of the area to be padded is not a multiple of five bytes, then padding pattern 500 will either overfill (overshoot) or underfill (undershoot) the area. To avoid overfilling/underfilling the area with padding pattern 500, a one-byte padding pattern may be used to pad a space that is smaller than five bytes. This one-byte padding pattern (which is also called a padding byte) may be 0xFF or some other byte value. In general, the padding may be achieved using the 5-byte padding pattern, the one-byte padding pattern, some other padding pattern, or any combination thereof. In general, any padding pattern may be used for padding as long as the receiver will not interpret the padding pattern as a valid MUX-PDU header or real data.

Figure 6:
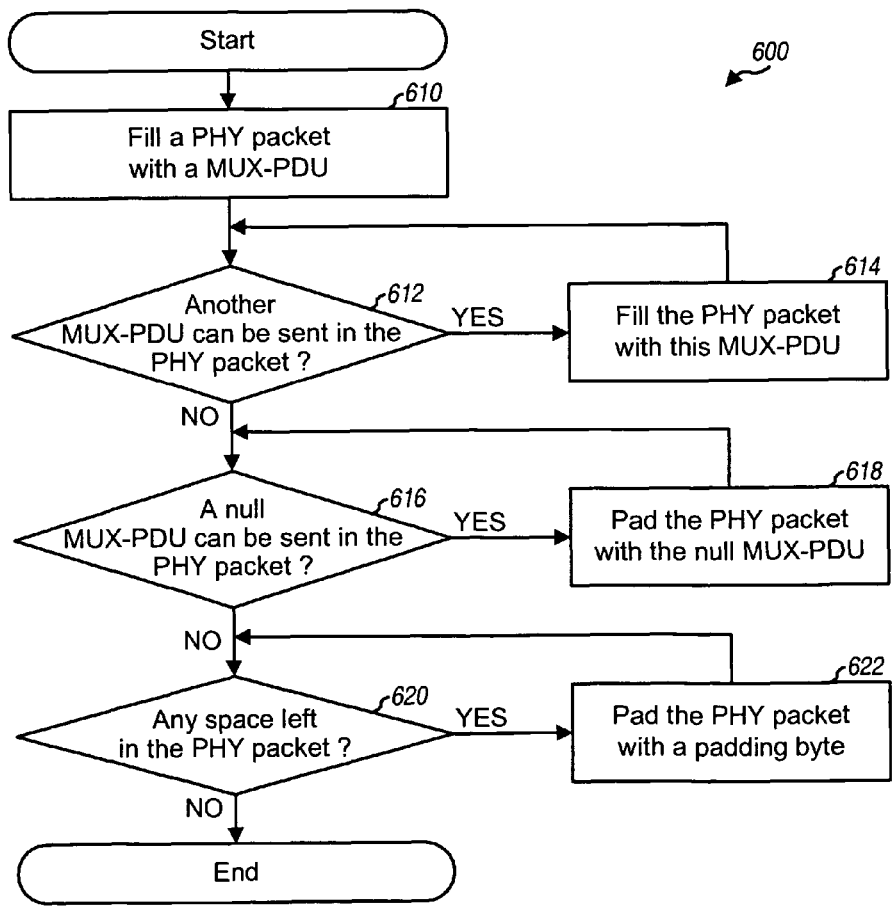
FIG. 6 shows a process to generate an aggregate MUX-PDU with one or more smaller MUX-PDUs and padding.

FIG. 6 shows a flow diagram of a process 600 to generate an aggregate MUX-PDU with one or more MUX-PDUs that are smaller than the PHY packet size. Process 600 may be performed by the multiplex layer at the transmitter. The aggregate MUX-PDU is sent in one PHY packet.

Initially, the aggregate MUX-PDU (or equivalently, the PHY packet) is filled with a MUX-PDU (block 610). A determination is then made whether another MUX-PDU (e.g., the next MUX-PDU) can be sent in the PHY packet (block 612). If the answer is 'Yes', then the PHY packet is filled with this MUX-PDU (block 614), and the process returns to block 612. Blocks 612 and 614 fit as many MUX-PDUs as possible in the PHY packet.

If the answer is 'No' for block 612, then a determination is made whether a null MUX-PDU (e.g., padding byte pattern 500) can sent in the remaining space in the MUX-PDU (block 616). If the answer is 'Yes' for block 616, then a null MUX-PDU is appended in the PHY packet (block 618), and the process returns to block 616. Blocks 616 and 618 pad the remaining space in the PHY packet with as many null MUX-PDUs as possible.

If the answer is 'No' for block 616, then a determination is made whether there is any space left in the PHY packet (block 620). If the answer is 'Yes' for block 620, then the PHY packet is padded with the one-byte fill pattern (block 622), and the process returns to block 620. Otherwise, if the answer is 'No' for block 620, then the process terminates. Blocks 620 and 622 pad the remaining space in the PHY packet with as many padding bytes as needed.

Figure 7:
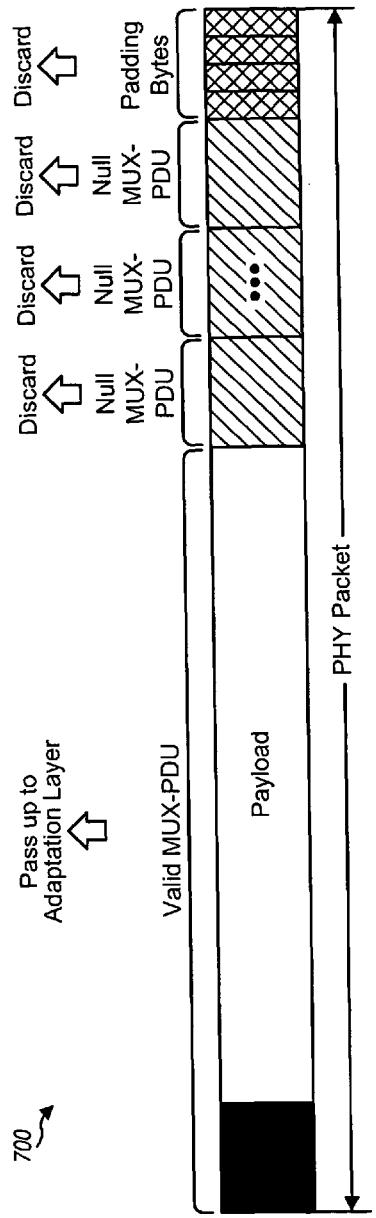
FIG. 7 shows a PHY packet that contains one MUX-PDU, multiple null MUX-PDUs, and multiple padding bytes.

FIG. 7 shows an example aggregate MUX-PDU 700 that contains one valid MUX-PDU, multiple null MUX-PDUs, and multiple padding bytes. The multiplex layer at the receiver (or simply, the receiver multiplex layer) receives the aggregate MUX-PDU from the physical layer, extracts the header of the first MUX-PDU, ascertains the size of this MUX-PDU based on its header, recovers the MUX-PDU, and sends the MUX-PDU up to the adaptation layer. The receiver multiplex layer then extracts the header for each null MUX-PDU sent in the aggregate MUX-PDU, recognizes each null MUX-PDU based on its header, and discards each null MUX-PDU. The receiver multiplex layer then encounters the first padding byte, detects that this byte is not for a valid MUX-PDU, regards this byte as an error, and discards the byte. For each subsequent byte, the receiver multiplex layer continues to search for a valid MUX-PDU header and discards all padding bytes that it encounters. The use of the padding bytes does not affect operation at the receiver multiplex layer.

FIGS. 6 and 7 show the case in which the first MUX-PDU is smaller than the PHY packet size. If the MUX-PDU is larger than the PHY packet size, then the MUX-PDU is sent in a minimum number (n) of PHY packets and the n-th PHY packet is padded as described above in FIG. 6.

Figure 8:
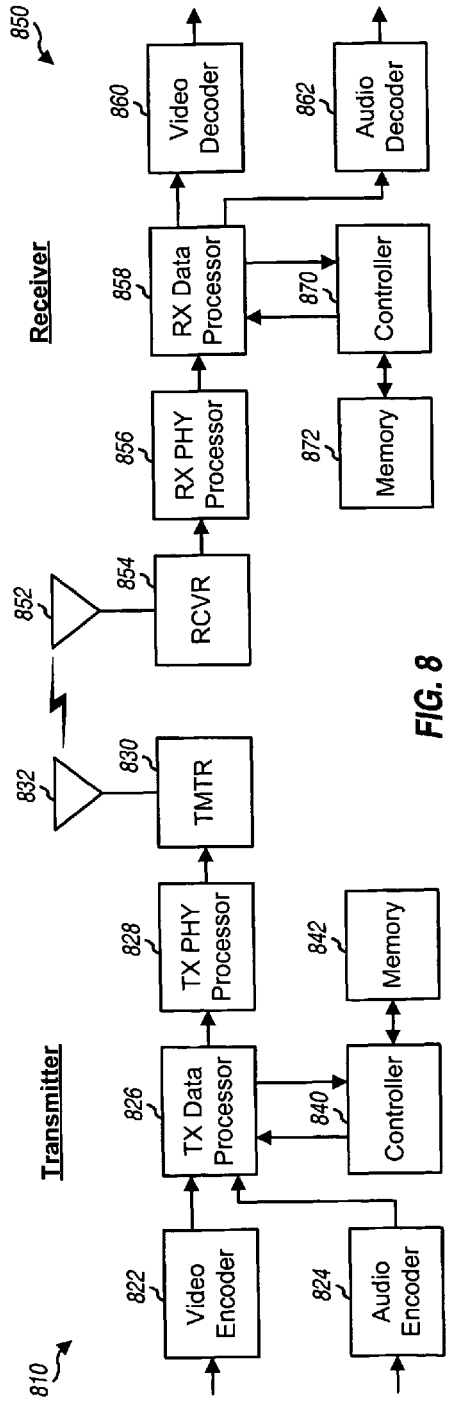
FIG. 8 shows a block diagram of a transmitter and a receiver.

FIG. 8 shows a block diagram of an embodiment of a transmitter 810 and a receiver 850 capable of implementing the multiplexing techniques described herein. Transmitter 810 and receiver 850 may each be part of a cellular phone, a handset, a subscriber unit, a mobile station, a user terminal, a wireless device, a modem, or some other apparatus.

At transmitter 810, a video encoder 822 receives and encodes a video signal and provides a coded video stream to a transmit (TX) data processor 826. An audio encoder 824 receives and encodes an audio signal and provides a coded audio stream to TX data processor 826. Encoders 822 and 824 may perform encoding in accordance with H.324M or some other standard or design. TX data processor 826 receives the coded video and audio streams from encoders 822 and 824, respectively, and data and control streams from a controller 840. TX data processor 826 implements the adaptation and multiplex layers for H.223, processes the received media streams, and generates MUX-PDUs based on the PHY packet size. A TX PHY processor 828 performs processing for the physical layer, processes (e.g., encodes, interleaves, and modulates) the MUX-PDUs as specified by the system, and generates PHY packets. A transmitter unit (TMTR) 830 conditions (e.g., converts to analog, filters, amplifies, and frequency upconverts) the PHY packets and generates a modulated signal, which is transmitted via an antenna 832.

At receiver 850, an antenna 852 receives the modulated signal transmitted by transmitter 810 and provides a received signal to a receiver unit (RCVR) 854. Receiver unit 854 conditions (e.g., filters, amplifies, and frequency downconverts) the received signal, digitizes the conditioned signal, and provides data samples. A receive (RX) PHY processor 856 processes (e.g., demodulates, deinterleaves, and decodes) the data samples and provides decoded PHY packets to an RX data processor 858. RX PHY processor 856 also provides an indication of each PHY packet that is decoded in error. RX data processor 858 implements the adaptation and multiplex layers for H.223 at the receiver and processes the decoded PHY packets. RX data processor 858 extracts valid MUX-PDUs in each decoded PHY packet, performs error detection and/or correction (if applicable), discards null MUX-PDUs and padding bytes, and demultiplexes the video, audio, data, and control onto separate media streams. RX data processor 858 provides the recovered video stream to a video decoder 860, the recovered audio stream to an audio decoder 862, and recovered data and control streams to a controller 870.

Video decoder 860 processes the recovered video stream and provides a decoded video signal. Audio decoder 862 processes the recovered audio stream and provides a decoded audio signal. Controller 870 processes the recovered data and control streams, provides decoded data, and generates controls to properly present the decoded video, audio, and data. In general, the processing by RX PHY processor 856, RX data processor 858, video decoder 860, audio decoder 862, and controller 870 is complementary to the processing performed by TX PHY processor 828, TX data processor 826, video encoder 822, audio encoder 824, and controller 840, respectively, at transmitter 810.

Controllers 840 and 870 also control the operation of various processing units at transmitter 810 and receiver 850, respectively. Memory units 842 and 872 store data and program codes used by controllers 840 and 870, respectively.

The multiplexing techniques described herein may be implemented by various means. For example, these techniques may be implemented in hardware, software, or a combination thereof. For a hardware implementation, the processing units used to perform multiplexing at a transmitter may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. The processing units used to perform the complementary demultiplexing at a receiver may also be implemented within one or more ASICs, DSPs, controllers, and so on.

For a software implementation, the multiplexing techniques may be implemented with modules (e.g., procedures, functions, and so on) that perform the functions described herein. The software codes may be stored in a memory unit (e.g., memory unit 842 or 872 in FIG. 8) and executed by a processor (e.g., controller 840 or 870). The memory unit may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus in a wireless communication system, comprising:
    means for receiving a plurality of physical layer (PHY) packets of a predetermined size and carrying a plurality of multiplex protocol data units (MUX-PDUs), each PHY packet carrying one or more MUX-PDUs, wherein each MUX-PDU that conforms to or is smaller than the predetermined size being sent in one PHY packet and each MUX-PDU that is larger than the predetermined size being sent in a plurality of PHY packets;
    means for processing each PHY packet to recover the one or more MUX-PDUs sent in the PHY packet; and
    means for demultiplexing the plurality of MUX-PDUs obtained from the plurality of PHY packets into a plurality of media streams, wherein the means for processing each PHY packet further comprises:
    means for examining each header encountered in the PHY packet to determine whether a valid MUX-PDU is being sent in the PHY packet,
    means for forwarding each valid MUX-PDU found in the PHY packet, and
    means for discarding any non-valid MUX-PDU and each padding byte encountered in the PHY packet.

2. A method of receiving a plurality of media streams in a wireless communication system, comprising:
    receiving a plurality of physical layer (PHY) packets of a predetermined size and carrying a plurality of multiplex protocol data units (MUX-PDUs), each PHY packet carrying one or more MUX-PDUs, wherein each MUX-PDU that conforms to or is smaller than the predetermined size being sent in one PHY packet and each MUX-PDU that is larger than the predetermined size being sent in a plurality of PHY packets;
    processing each PHY packet to recover the one or more MUX-PDUs sent in the PHY packet; and
    demultiplexing the plurality of MUX-PDUs obtained from the plurality of PHY packets into a plurality of media streams, wherein the processing each PHY packet further comprises:
    examining each header encountered in the PHY packet to determine whether a valid MUX-PDU is being sent in the PHY packet,
    forwarding each valid MUX-PDU found in the PHY packet, and
    discarding any non-valid MUX-PDU and each padding byte encountered in the PHY packet.

3. A processor comprising a non-transitory readable medium for storing instructions operable in a wireless device to: receive a plurality of physical layer (PHY) packets of a predetermined size and carrying a plurality of multiplex protocol data units (MUX-PDUs), each PHY packet carrying one or more MUX-PDUs, wherein each MUX-PDU that conforms to or is smaller than the predetermined size being sent in one PHY packet and each MUX-PDU that is larger than the predetermined size being sent in a plurality of PHY packets; process each PHY packet to recover the one or more MUX-PDUs sent in the PHY packet; and demultiplex the plurality of MUX-PDUs obtained from the plurality of PHY packets into a plurality of media streams, wherein to process each PHY packet further comprises: examining each header encountered in the PHY packet to determine whether a valid MUX-PDU is being sent in the PHY packet, forwarding each valid MUX-PDU found in the PHY packet, and discarding any non-valid MUX-PDU and each padding byte encountered in the PHY packet.

4. An apparatus, comprising:

a processor adapted to:

receive a plurality of physical layer (PHY) packets of a predetermined size and carrying a plurality of multiplex protocol data units (MUX-PDUs), each PHY packet carrying one or more MUX-PDUs, wherein each MUX-PDU that conforms to or is smaller than the predetermined size being sent in one PHY packet and each MUX-PDU that is larger than the predetermined size being sent in a plurality of PHY packets;

process each PHY packet to recover the one or more MUX-PDUs sent in the PHY packet; and demultiplex the plurality of MUX-PDUs obtained from the plurality of PHY packets into a plurality of media streams, wherein to process each PHY packet further comprises:

examine each header encountered in the PHY packet to determine whether a valid MUX-PDU is being sent in the PHY packet, forward each valid MUX-PDU found in the PHY packet, and discard any non-valid MUX-PDU and each padding byte encountered in the PHY packet.

* * * * *